United States Patent [19]

Batchelar

[11] 4,209,483
[45] Jun. 24, 1980

[54] METHOD OF MAKING A NOTCHED TRANSMISSION BELT

[75] Inventor: Peter H. Batchelar, Cheshire, Conn.

[73] Assignee: Uniroyal, Inc., New York, N.Y.

[21] Appl. No.: 894,300

[22] Filed: Apr. 7, 1978

Related U.S. Application Data

[63] Continuation of Ser. No. 698,980, Jun. 23, 1976, abandoned, which is a continuation of Ser. No. 526,888, Nov. 25, 1974, abandoned.

[51] Int. Cl.² .............................................. B29H 7/22
[52] U.S. Cl. .................................... 264/159; 264/258; 264/315
[58] Field of Search ............... 264/257, 258, 313, 314, 264/315, 159; 156/137, 138, 139, 140, 141, 142; 425/28 B, 34 B, 39; 74/231 C

[56] References Cited

U.S. PATENT DOCUMENTS

| | | | |
|---|---|---|---|
| 2,671,244 | 3/1954 | Freedlander | 425/28 B |
| 2,773,540 | 12/1956 | Waugh | 156/138 |
| 3,458,611 | 7/1969 | Roberts | 264/314 X |
| 3,983,193 | 9/1976 | Wulker | 264/36 |
| 4,053,547 | 10/1977 | Redmond | 264/257 X |

Primary Examiner—Thomas P. Pavelko
Attorney, Agent, or Firm—Charles A. Blank

[57] ABSTRACT

A method of making a notched variable speed belt or a notched V-belt by placing the layers of the belt around a smooth cylindrical mold, placing an endless elastomeric sleeve having ribs on its inner surface, around the mold and layers thereon and applying heat and pressure to urge the sleeve against the belt layers to form a cured belt slab with molded grooves therein. The cured belt slab may then be cut into individual notched V-belts or variable speed belts of high quality.

4 Claims, 6 Drawing Figures

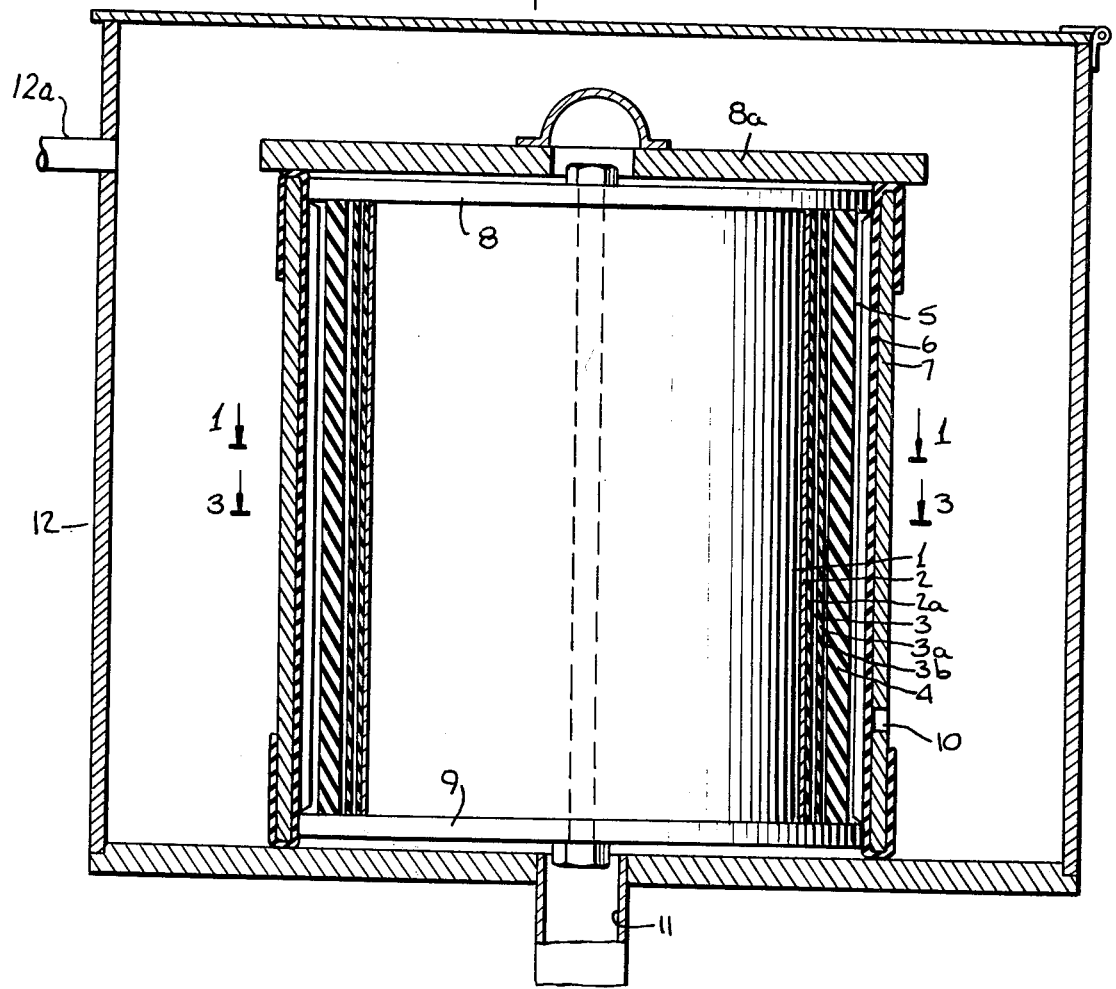
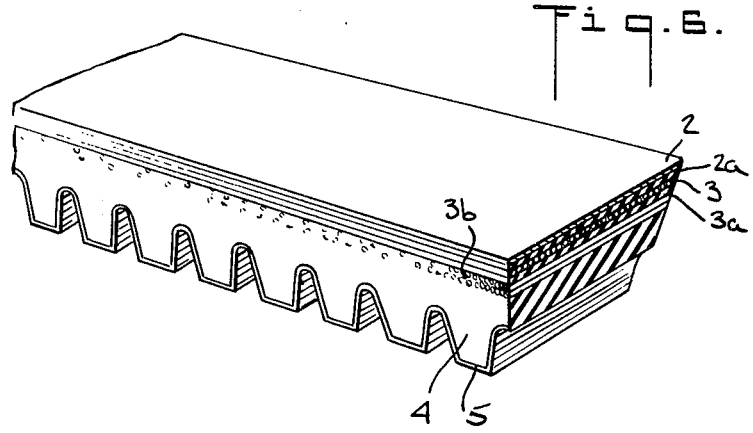

METHOD OF MAKING A NOTCHED TRANSMISSION BELT

This is a continuation of application Ser. No. 698,980, filed June 23, 1976, now abandoned. Application Ser. No. 698,980, filed June 23, 1976, is a continuation of application Ser. No. 526,888, filed Nov. 25, 1974, now abandoned.

This invention relates to a method of making a notched transmission belt, for example, a notched variable speed belt or a notched V-belt generally similar to the type described in U.S. Pat. No. 2,945,389.

Heretofore, such belts have been made, for example, by using ring molding followed by machining of notches in the belt or, alternatively, by using an expensive metal ring mold having the belt notched portions formed in the metal ring. Only one belt can be made at a time in each ring mold.

It is an object of the present invention, therefore, to provide a new and improved method of making a notched power transmission belt which avoids one or more of the disadvantages of such prior methods.

It is another object of the invention to provide a new and improved method of molding a high-quality notched power transmission belt which avoids one or more of the disadvantages of such prior method of manufacture.

It is another object of the invention to provide a method of manufacturing a notched raw edge belt using a minimal amount of labor.

In accordance with the invention, a method of making a notched transmission belt comprises placing around a mold having a smooth surface component layers of a transmission belt including at least one layer of elastomeric material. The method includes disposing around the mold and layers thereon an endless elastomeric sleeve having an inner surface with ribs formed thereon. The method also includes urging the sleeve against the layers on the mold under heat and pressure to form a cured belt slab having an outer surface having molded grooves therein.

For a better understanding of the present invention, together with other and further objects thereof, reference is had to the following description taken in connection with the accompanying drawings, and its scope will be pointed out in the appended claims.

Referring now to the drawings:

FIG. 2 is an elevational view, in section, of a mold and sleeve useful in making belts in accordance with the method of the present invention disposed in a vulcanizer;

FIG. 6 is a fragmentary perspective view of a belt constructed in accordance with the method of the invention.

Figure 1:
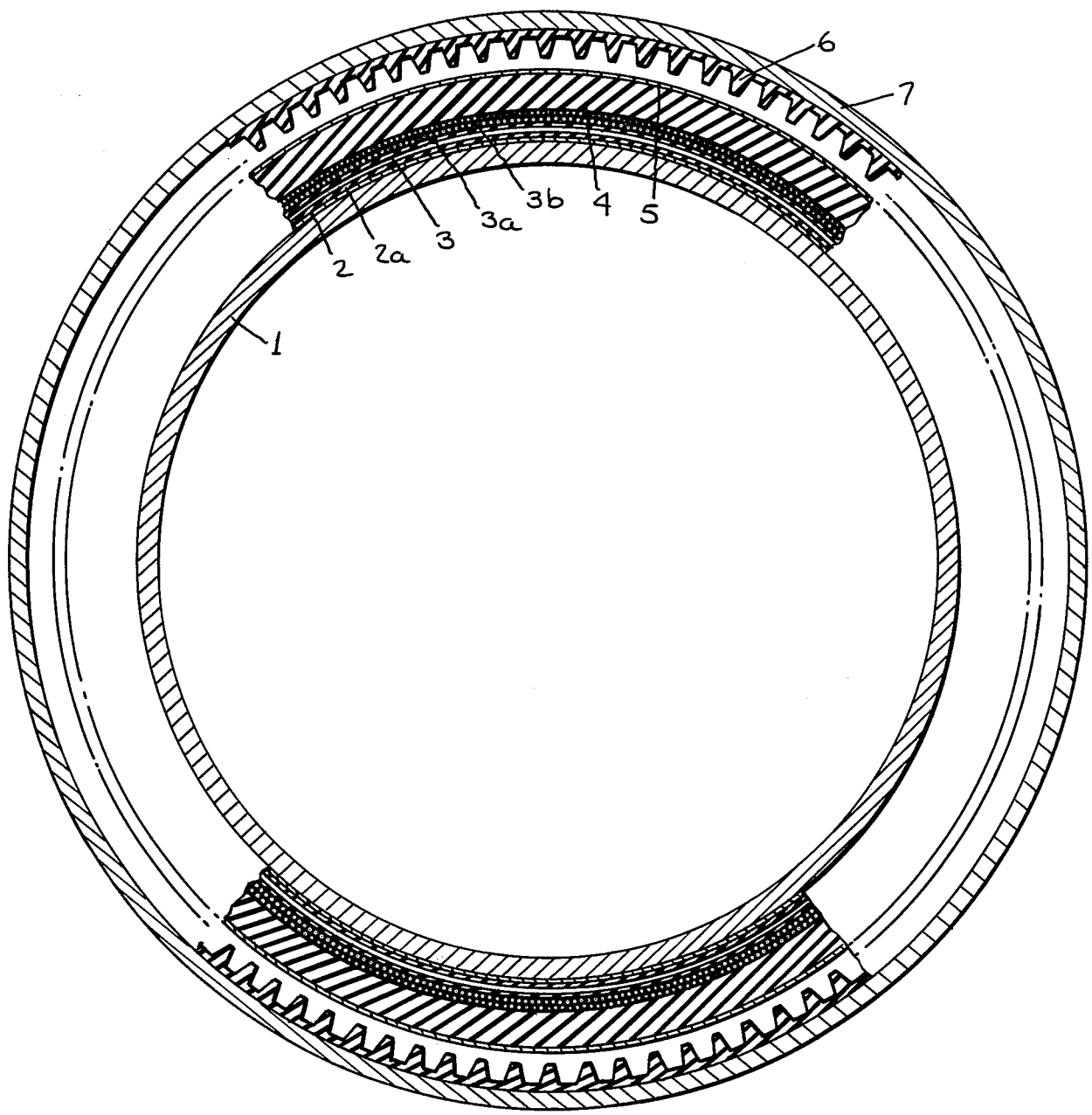
FIG. 1 is a sectional view, taken along line 1—1 of FIG. 2, of belt components around a cylindrical mold with the belt components and the sleeve surrounding them drawn to an enlarged scale.

Referring now more particularly to FIG. 1 of the drawings, a method of making a notched transmission belt comprises placing around a mold having a smooth surface and preferably comprising a cylindrical roll, component layers of a transmission belt including at least one layer of elastomeric material. Accordingly, the method may comprise placing around a suitable mold 1, for example, a layer of fabric 2, for example, one or two plies of cotton duck fabric or nylon fabric, and placing around the fabric layer a thin layer of elastomeric material 2a, for example, a neoprene cushion stock of 0.015 inch gauge. The method includes, for example, winding a reinforcing cord 3 as a tensile member in a layer over the layer of elastomeric material. The tensile member preferably is helically wound at, for example, 18 strands per inch. The tensile member may be, for example, 0.045 diameter polyester cord, steel cord, rayon cord, fiberglass cord or any other suitable material.

The method may include placing over the cord layer 3 a second thin layer of elastomeric material 3a which may be neoprene cushion stock of 0.015 inch gauge. There then may placed circumferentially across the full width of the belt slab, that is, longitudinally of the cylindrical mold, for example, two plies of rayon tire cord 3b skim-coated with a neoprene stock. The tire cord plies 3b may be omitted or one or more plies may be used. The method also includes the step of placing a layer 4 of elastomeric material over the plurality of layers of cord fabric. The layer 4 may be applied as, for example, 5 plies by 0.060 inch of a cotton or other textile fiber or flock-loaded neoprene rubber. A layer 5 of, for example, 0.015 inch nylon stretch fabric skim-coated with neoprene rubber may then be applied as a jacket 5 over the layer 4 of elastomeric material.

The method also includes disposing an elastomeric sleeve 6 having an inner layer with ribs formed thereon around the mold 1 and layers thereon and urging the sleeve against the layers on the mold under heat and pressure to form a cured belt slab having an outer surface having molded grooves therein.

The elastomers used to manufacture the sleeve 16 should have good heat resistance, good stretch characteristics and good tear resistance, for example, as provided by an EPDM (ethelyene-propylene-diene terpolymer) formulation such as:

|  | Parts |
| --- | --- |
| Royalene 502 | 100 |
| Stearic Acid | 1 |
| Zinc Oxide | 15 |
| N 550 | 85 |
| Sunpar 2280 | 20 |
| Sunproof | 0.2 |
| MBT | 3.0 |
| TMTD | .75 |
| ZDBDC | 1.5 |
| Sulfur | .50 |

Royalene 502 is ethylene-propylene-diene terpolymer from Uniroyal, Inc. N550 is fast extruding furnace carbon black from Phillips Petroleum or Huber or Continental. Sunpar 2280 is paraffinic oil plasticizer from Sun Oil Co. Sunproof is antiozonant wax from Uniroyal, Inc. MBT is 2-mercaptobenzothiazole from Uniroyal, Inc. TMTD is tetramethylthiuram disulfite from Uniroyal, Inc. ZDBDC is zinc dibutyl dithiocarbamate from Uniroyal, Inc.

The ribbed sleeve 6 can be made, for example, in a flat press by forcing rubber into a flat mold having the desired configuration, or other conventional molding methods could be used in the fabrication of this sleeve.

Figure 3:
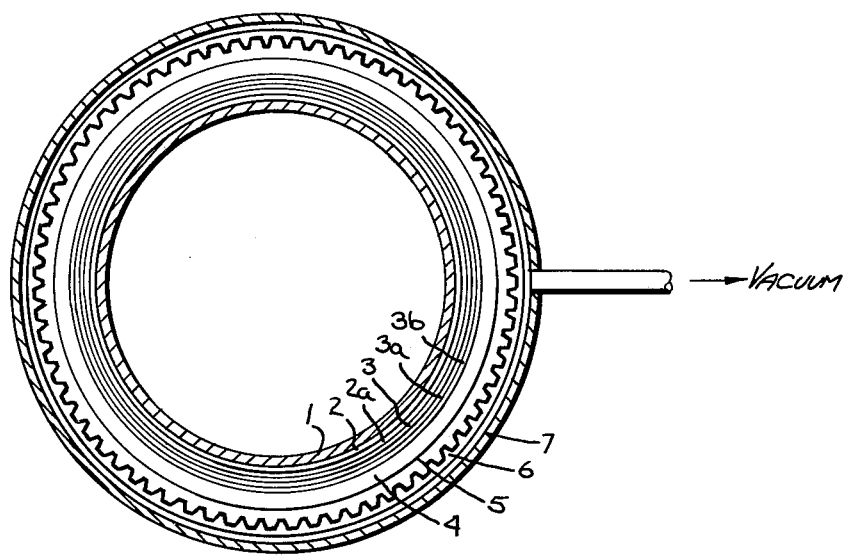
FIG. 3 is a sectional view, taken along line 3—3 of FIG. 2, of the mold and belt slab at one step of the method of the invention.
Figure 4:
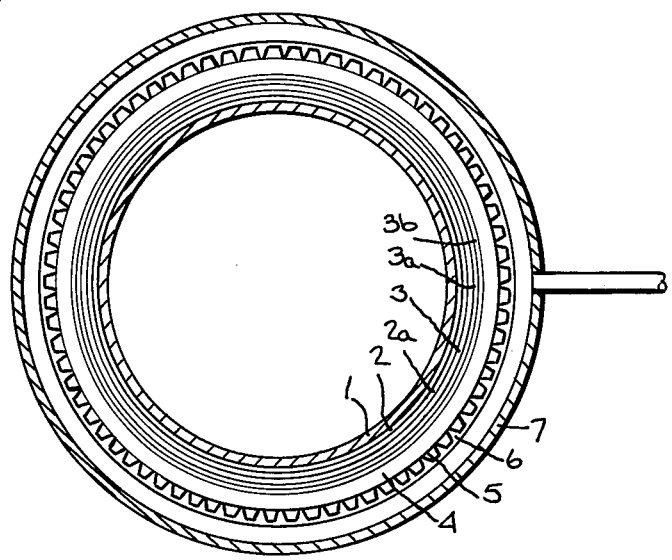
FIG. 4 is a diagrammatic sectional view of the mold and belt slab with the sleeve in contact with the belt slab.
Figure 5:
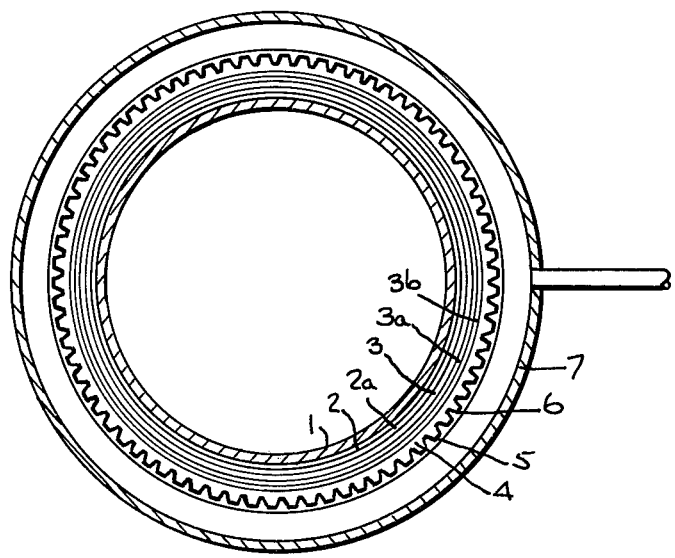
FIG. 5 is a diagrammatic sectional view of the mold and belt slab with the sleeve shaping the belt slab.

A cylindrical steel shell 7 having the sleeve 6 mounted thereon, represented in FIG. 2, is placed around the layers of belt material while applying a suitable vacuum to inlet 10 to retract the sleeve 6 against the inner surface of shell 7 as represented in FIG. 3. The vacuum is removed after the sleeve has been placed over the mold assembly. The mold end plates 8 and 9 have suitable apertures (not shown) through which steam under low pressure, for example 50 p.s.i. from an inlet 11 of a vulcanizer 12 in which the mold assembly is placed, may enter the mold assembly. A bonnet 8a seals the top of shell 7 and ribbed sleeve 6 to isolate the high pressure region within the vulcanizer. Steam under high pressure, for example, 125 p.s.i. from vulcanizer inlet 12a enters the space between shell 7 and sleeve 6 through inlet 10 and provides the heat and pressure to form the notches and cure the belt slab. As represented in FIG. 4, before vulcanization and after removal of the vacuum, the sleeve 6 contracts to make contact with the outer layer of the belt. As represented in FIG. 5, during vulcanization the heat has softened the rubber of the belt and the pressure therefrom has forced the sleeve to relax further as the rubber flowed into its notches. Additional molding pressure is provided by high pressure steam entering port 10. Lower pressure steam entering port 11 aids in bleeding the air from the notch cavities and provides a pressure differential to aid in vulcanization. After vulcanization, a vacuum may be applied to free the sleeve from the belt so that the sleeve can be removed and re-used.

The belt slab can be stripped from the mold 1 and cut, ground or separated into individual endless belts, for example, as represented in FIG. 6. The individual belts may also be formed by cutting or grinding before stripping the belt from the mold.

While there has been described what is at present considered to be the preferred embodiment of this invention, it will be obvious to those skilled in the art that various changes and modifications may be made therein without departing from the invention, and it is, therefore aimed to cover all such changes and modifications as fall within the true spirit and scope of the invention.

What is claimed is:

1. A method of making a notched transmission belt comprising:
    placing around a mold having a smooth cylindrical surface component layers of a transmission belt including at least one layer of elastomeric material;
    disposing around the mold and layers thereon an endless elastomeric sleeve having an inner surface with ribs formed thereon extending axially of the mold and a shell surrounding said sleeve;
    laterally expanding said endless elastomeric sleeve against said shell while disposing said sleeve around the mold and layers thereon;
    urging said sleeve against said layers on said mold under heat and pressure to form a cured belt slab having an outer surface having molded grooves therein;
    said sleeve sealing said mold and said layers thereon inside said sleeve from the pressure region exterior to said sleeve;
    separating said cured belt slab into a plurality of belts;
    and removing said sleeve from said cured belt slab prior to the step of separating said cured belt slab into a plurality of belts.

2. A method in accordance with claim 1 which includes the steps of:
    placing around a mold having a smooth surface a layer of fabric;
    placing around said fabric layer a thin layer of a curable elastomeric material;
    winding a reinforcing cord in a layer over said layer of elastomeric material;
    placing around said cord layer a second thin layer of curable elastomeric material;
    placing a layer of curable elastomeric material over said second thin layer of elastomeric material; and
    placing a layer of fabric over said outer layer of elastomeric material.

3. A method in accordance with claim 1 which includes the steps of:
    placing around a mold having a smooth surface a layer of fabric;
    placing around said fabric layer a thin layer of a curable elastomeric material;
    winding a reinforcing cord in a layer over said layer of elastomeric material;
    placing around said cord layer a second thin layer of curable elastomeric material;
    placing around the second thin layer of elastomeric material a plurality of layers of cord fabric;
    placing a layer of curable elastomeric material over said plurality of layers of cord fabric; and
    placing a layer of fabric over said outer layer of elastomeric material.

4. A method in accordance with claim 1 which includes the step of applying a vacuum between said sleeve and said shell surrounding said sleeve while disposing the mold and layers thereon within said sleeve.

* * * * *